April 5, 1966  L. WALLERSTEIN, JR  3,244,393
RECTILINEAR MOUNTING SYSTEM
Filed May 23, 1963
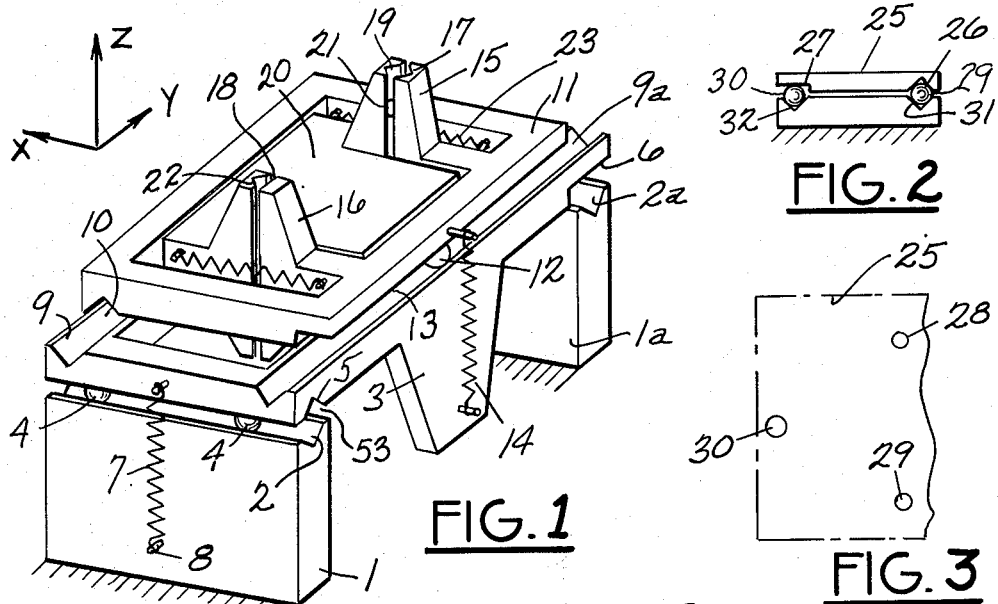
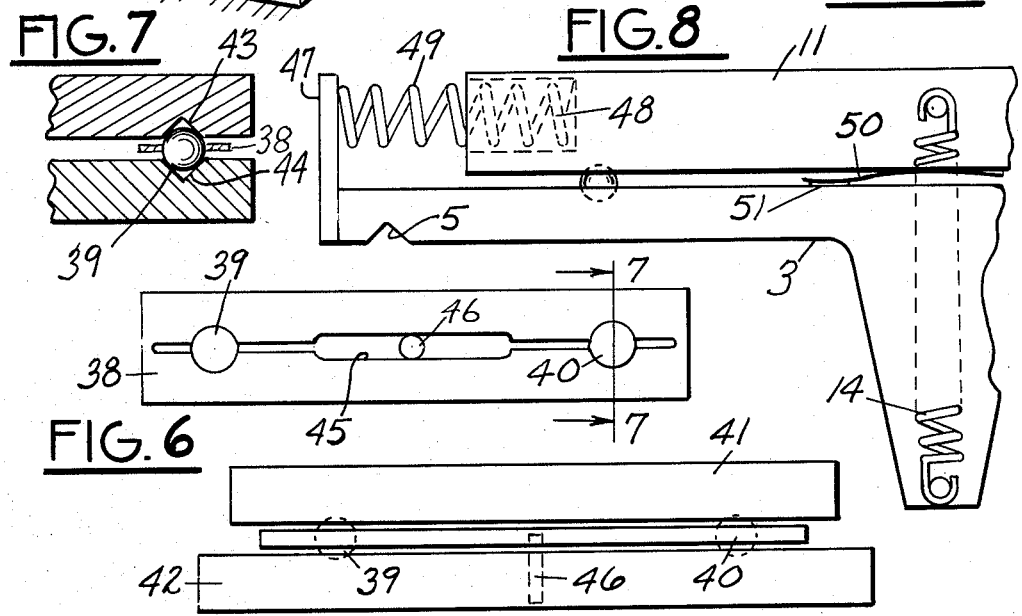
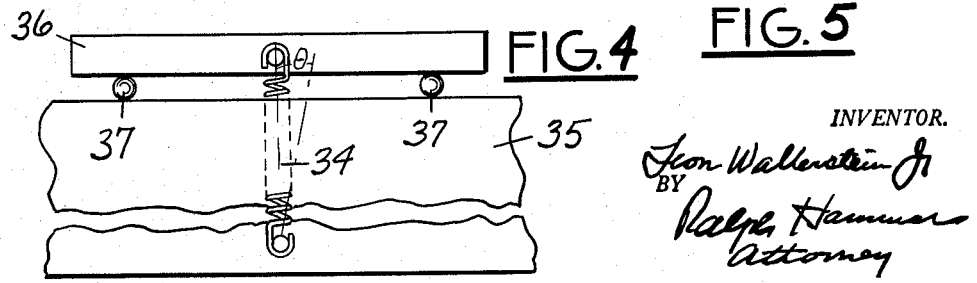
INVENTOR.
Leon Wallerstein Jr
BY Ralph Hammar
Attorney United States Patent Office 3,244,393
Patented Apr. 5, 1966

3,244,393
RECTILINEAR MOUNTING SYSTEM
Leon Wallerstein, Jr., Erie, Pa., assignor to Lord Manufacturing Company, Erie, Pa., a corporation of Pennsylvania
Filed May 23, 1963, Ser. No. 282,698
7 Claims. (Cl. 248—358)

This invention is a mounting system for protecting equipment from translational vibration while prohibiting rotational motions of the equipment. Such systems are used in missile guidance and the like.

In a preferred form, there are three frames mounted one on the other and each frame is resiliently restrained and guided for translational movement in a single direction perpendicular to the directions of movement of the other two frames. The guiding for each direction may be by balls riding on spaced tracks, at least one of which is V grooved. The elastic restraint may be by tension springs connected between each track and the part riding thereon. Supplemental springs and damping may be used.

In the drawing, FIG. 1 is a perspective of one form of the mounting system, FIG. 2 is an end view of the tracks between any two of the relatively movable members, FIG. 3 is a plan view showing the distribution of the balls in the FIG. 2 track, FIG. 4 is is a diagrammatic view of the structure providing the resilient restraint, FIG. 5 is a side view of one of the ball retainers, FIG. 6 is a plan view of the ball retainer, FIG. 7 is a section on line 7—7 of FIG. 6, and FIG. 8 is a diagrammatic view showing supplemental springs and dampers.

FIG. 1 shows the structural and functional elements for supporting equipment for translational movement along mutually perpendicular axes X, Y and Z while prohibiting rotationl movement about any of these axes. The mounting system comprises a base member 1, 1a having at its upper edge V grooves 2, 2a oriented in the X direction. A frame member 3 is supported for movement in this direction by balls 4 riding in groove 2 and in a mating V groove 5 and by a single ball (not shown) between a flat surface 6 and groove 2a. The balls 4 in conjunction with the V grooves 2 and 5 confine the movement of the frame 3 to the X direction. The flat surface 6 prevents binding in case the grooves 2 and 2a are not perfectly parallel. If the grooves 2 and 2a were perfectly parallel, a V groove similar to and perfectly parallel to the groove 5 could be substituted for the flat surface 6. A coil spring 7 at each end of the base and anchored at its upper end to the frame 3 and at its lower end to the base resiliently resists translation of the frame 5 to either side of the central position shown. The spring 7 also holds the balls seated in the grooves 2, 2a against forces in any other direction.

On the upper side of the frame 3 are V grooves 9, 9a extending in the Y direction. In the V groove 9 are two balls (not shown) fitting in a V groove 10 on the under side of a frame member 11 and providing an anti friction track for translational movement of the frame 11 in the Y direction. In the groove 9a is a single ball 12 cooperating with a flat surface 13 on the under side of the frame 11. The flat surface 13 has the same function as the flat surface 6 for the frame 3. The three ball support in conjunction with the flat surface 13 eliminates the need for maintaining the V grooves precisely parallel. Tension springs 14 on opposite sides of the frame 11 and having upper and lower ends respectively anchored to the frame 11 and to the frame 3 resiliently cushion excursion of the frame 11 relative to the frame 3 and also maintain the balls seated in the V grooves 9 and 9a under forces in other than the Y direction.

The frame 11 has projections 15, 16 respectively provided with a V groove 17 and a flat surface 18 extending in the Z direction. The V groove 17 cooperates with a corresponding V groove 19 in a frame member 20 to provide an anti friction track for two balls 21 (only one of which is shown). The plane surface 18 cooperates with a V groove 22 in the frame 20 to provide a guide for a single ball (not shown). Tension springs 23 having opposite ends anchored respectively on the frames 11 and 20, hold the balls seated in the V grooves and provide spring cushioning action for relative movement of the frames 11 and 20 in the Z direction. The equipment is mounted on the frame 20.

By this construction, the equipment mounted on the frame 20 may have translational movement in any of the three mutually perpendicular directions X, Y, Z but is restrained from rotational movement. This permits translational vibration protection without changing the angular orientation of the equipment.

FIGS. 2 and 3 illustrate diagrammatically the three ball support and track system for confining the relative movement of any one of the frames 3, 11, 20 to translation in a single direction. As there shown, one of the frames is designated by the numeral 25 and has on its under side a V groove 26 extending in the direction in which rectilinear movement is desired and a flat surface 27. The V groove 26 engages two balls 28, 29 and the flat surface 27 engages a single ball 30. The two balls 28, 29 are spaced along the length of the V groove 26 and fit in a V groove 31 extending in the direction in which translational movement is desired. The ball 30 fits in a V groove 32 which extends generally in the direction of the V groove 31 but need not be precisely parallel to the V groove 31. By the combination of the V grooves 31, 32 and the three balls 28, 29, 30, a three point support with zero mechanical clearance or looseness is provided for the frame 25 without requiring a high degree of precision machining. All three balls 28, 29, 30 are effective for guiding the translational movement of the frame 25. Only two of the balls, namely, 28, 29, are effective to resist movement of the frame 25 crosswise of the grooves. If substantial forces in this direction are expected, it would be preferable to replace the plane surface 27 by a V groove similar to the V groove 26 and guiding the movement of the frame. All balls would then resist movement of the frame crosswise of the grooves. Additional balls can be used if desired.

FIG. 4 illustrates diagrammatically the resilient cushioning effect such as provided by the springs 7, 14 and 23. As there shown, a tension spring 34 has one end anchored on a member 35 and the opposite end anchored on a member 36. Balls 37 are arranged between the members. The members 35 and 36 are shown in the central position. When the spring 34 is installed, it is stretched and the initial tension or preload is $k(L-Lo)$ where Lo is the free length of the spring, L is the stretched or installed length of the spring and $k$ is the stiffness or spring constant of the spring. As the frame 36 is displaced through a distance $L \tan \theta$, there is a restoring force which is equal to $F \sin \theta$ where F is the tension in the spring. Since the displacement of the frame is ordinarily through small angles, the effective spring constant $k_x$ in the direction of the displacement is substantially $$\frac{k(L-Lo)}{L}$$

and can be varied by increasing or decreasing the preload. This is advantageous because spring constant is the frequency determining parameter for vibration isolation.

FIGS. 5, 6 and 7 show a retainer 38 for balls 39, 40 arranged between members 41, 42 having V grooves 43, 44. At the center of the retainer is a clearance slot 45 for a centering pin 46 fixed to the member 42. The slot extends substantially the full length of the retainer and provides sufficient yielding so that the balls may be snapped into the retainer.

In case the springs 7, 14, 23 do not provide adequate cushioning action, supplemental or auxiliary springs may be used as shown in FIG. 8. The springs there shown are for use between the frames 3 and 11 but it will be understood that the same structure could be applied to other parts of the mounting system. As there shown, a spring seat member 47 is fixed to the frame 3 and a socket 48 is provided in the frame 11. This structure would be duplicated at the opposite end of the frames. Springs 49 arranged between the spring seat member 47 and the socket 48 provide additional or supplemental spring action resisting the rectilinear excursion of the frame 11 relative to the frame 3. Friction damping may be provided by a leaf spring 50 fixed to the frame 11 and having a friction pad 51 bearing on the frame 3.

What is claimed as new is:

1. A mounting system comprising a base member having a first track oriented in a first direction, a first frame member guided on the first track, a first spring means for resisting movement of the first frame member from a predetermined position on the first track, said first frame member having a second track oriented in a second direction perpendicular to said first direction, a second frame member guided in said second track, a second spring means for resisting movement of the second frame member from a predetermined position on the second track, said second frame member having a third track oriented in a third direction perpendicular to said first and second directions, a third frame member guided on said third track, and a third spring means for resisting movement of the third frame member from a predetermined position on the third track.

2. The mounting system of claim 1 in which the track for at least one of the members and the member guided thereon comprise opposed grooves on the respective members and aligned with each other with two balls in load carrying relation between the grooves and a third ball riding on a plane surface on one of the members.

3. The mounting system of claim 1 in which the tracks guiding one member includes three rollers with two rollers in line with the direction of the tracks and with the third roller offset from and providing in conjunction with the other two rollers a three point support.

4. The mounting system of claim 1 in which the track for at least one member and the frame member guided thereon comprise opposed V grooves on the respective members and aligned with each other and associated balls riding in the grooves and in which the spring means are preloaded springs connected to said members and holding the members against the balls.

5. A mounting system comprising a base member having a first track oriented in a first direction, a first frame member guided on the first track, a first spring means for resisting movement of the first frame member from a predetermined position on the first track, said first frame member having a second track oriented in a second direction perpendicular to said first direction, a second frame member guided in said second track, a second spring means for resisting movement of the second frame member from a predetermined position on the second track, said second frame member having a third track oriented in a third direction perpendicular to said first and second directions, a third frame member guided on said third track, and a third spring means for resisting movement of the third frame member from a predeterminder position on the third track and damping means between at least one frame member and its track.

6. In a mounting system, supporting and supported members, first and second grooves in one member laterally spaced from each other and extending generally in the same direction, a third groove in the other member in opposed relation to an aligned with the first groove, a plane surface on the other member in opposed relation to said second groove, first and second balls spaced from each other and riding in said first and third grooves, and a third ball riding in the second groove and on said plane surface, said other member being free of structure other than said plane surface contacting said third ball whereby the third ball is free to move over said plane surface in both longitudinal and crosswise directions relative to said first and third grooves.

7. In a mounting system, supporting and supported members, first and second grooves in one member laterally spaced from each other and extending generally in the same direction, a third groove in the other member in opposed relation to and aligned with the first groove, a plane surface on the other member in opposed relation to said second groove, first and second balls spaced from each other and riding in said first and third grooves, and a third ball riding in the second groove and on said plane surface, said other member being free of structure other than said plane surface contacting said third ball whereby the third ball is free to move over said plane surface in both longitudinal and crosswise directions relative to said first and third grooves, and tension spring means extending normal to the grooves in the central position of the members and anchored at opposite ends to said members for holding said members against the balls and for providing an elastic restraint to movement of the members from said central position along the first and third grooves.

References Cited by the Examiner

UNITED STATES PATENTS

| | | | |
|---|---|---|---|
| 438,941 | 10/1890 | Pepple | 248—358.1 X |
| 1,857,715 | 5/1932 | Falvo | 248—361 X |
| 2,226,374 | 12/1940 | Gieleghem | 248—430 |
| 2,622,940 | 12/1952 | Johnson | 248—430 |
| 2,841,354 | 7/1958 | Humble | 248—358 |
| 3,057,592 | 10/1962 | Thrasher | 248—358 |

CLAUDE A. LE ROY, *Primary Examiner.*